Patented July 1, 1952

2,602,056

UNITED STATES PATENT OFFICE 2,602,056

PROCESS FOR BREAKING PETROLEUM EMULSIONS

Melvin De Groote, University City, Mo., assignor to Petrolite Corporation, Ltd., Wilmington, Del., a corporation of Delaware No Drawing. Application September 25, 1950, Serial No. 186,683

7 Claims. (Cl. 252—335)

My invention provides an economical and rapid process for resolving petroleum emulsions of the water-in-oil type that are commonly referred to as "cut oil," "roily oil," "emulsified oil," etc., and which comprise fine droplets of naturally-occurring waters or brines dispersed in a more or less permanent state throughout the oil which constitutes the continuous phase of the emulsion.

It also provides an economical and rapid process for separating emulsions which have been prepared under controlled conditions from mineral oil, such as crude oil and relatively soft waters or weak brines. Controlled emulsification and subsequent demulsification under the conditions just mentioned are of significant value in removing impurities, particularly inorganic salts, from pipeline oil.

Demulsification as contemplated in the present application includes the preventive step of commingling the demulsifier with the aqueous component which would or might subsequently become either phase of the emulsion in the absence of such precautionary measure. Similarly, such demulsifier may be mixed with the hydrocarbon component.

The demulsifying agent employed in the present process is an ester salt of a tribasic acid in which two carboxyl radicals appear in ester form and a sulfo radical appears in salt form. Such compounds are derived preferably by reaction between three types of reagents: (a) water-insoluble and kerosene-soluble polypropylene glycol ethers derived from alcohols having less than 8 uninterrupted carbon atoms in any single radical and generally of a molecular weight range of 750 to approximately 3,000; (b) a dicarboxy compound selected from the class consisting of maleic acid (or anhydride), citraconic acid (or anhydride), and fumaric acid; and (c) an alkali metal bisulfite such as sodium bisulfite or potassium bisulfite.

The preparation of the demulsifying agent involves substantially two steps: (a) esterification between two moles of the polypropylene glycol ether and one mole of a dicarboxy compound such as maleic anhydride, and (b) reaction of such ester with a suitable alkali metal bisulfite such as sodium bisulfite.

More specifically then the present invention is concerned with a process for breaking petroleum emulsions of the water-in-oil type characterized by subjecting the emulsion to the action of a demulsifier including hydrophile synthetic products; said hydrophile synthetic products being characterized by the following formula:

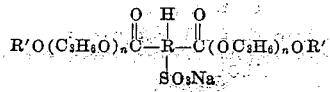

in which

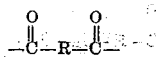

is the divalent radical of an unsaturated dicarboxy acid selected from the class consisting of maleic acid, fumaric acid, and citraconic acid, and $n$ is a whole number varying from 12 to 80; R' is a hydrocarbon radical having less than 8 carbon atoms; and with the further proviso that the polypropylene glycol ether prior to esterification be water-soluble an kerosene-soluble.

In the above formula the alkali metal cation is shown as sodium which is the cheapest and most readily available. Needless to say, any other alkali metal cation, such as potassium, may be employed in the form of potassium bisulfite and is included in the hereto attached claims as the obvious chemical equivalent. Similarly, ammonium bisulfite may be employed instead of sodium or potassium bisulfite. This applies also to a bisulfite of various organic bases provided, of course, that such bases prior to forming a sulfite are as basic as ammonia and that the sulfite is water-soluble. All these are the obvious functional equivalents of sodium bisulfite.

The glycol ethers can be obtained by a number of procedures as exemplified by the following: (a) subject the monohydric compound, such as methyl, ethyl or propyl alcohol to oxypropylation, or (b) prepare the polypropylene glycol or obtain it commercially and then subject it to etherization. Various monohydroxylated compounds may be used, such as an alcohol, phenol, phenoxyalkanol, or the like, free from any radical having uninterrupted 8 carbon atoms or more. Such compound may be reacted with propylene oxide so as to obtain a high molal alcohol ether or glycol ether.

Suitable monohydric materials include the usual aliphatic alcohols, such as methyl alcohol, ethyl alcohol, propyl alcohol, butyl alcohol, allyl alcohol, hexyl alcohol, etc. Also there are included the phenols such as hydroxybenzene and cresol. Similarly, the hydrogenated derivatives of such phenols, i. e., the alicyclic alcohols, are included. Benzyl alcohol and hydrogenated benzyl alcohol may be used. Other alcohols which can be employed include tetrahydropyran-2-methanol and tetrahydrofurfuryl alcohol. My preference is to use aliphatic alcohols having at least 3 carbon atoms and preferably being water-soluble. This includes propyl alcohol, butyl alcohol, or amyl alcohol. In the case of butyl and amyl alcohols some of the isomers are water-soluble to the extent that they show solubility of a few percent at room temperature. Reference to the hydrocarbon group of such alcohols includes, of course, the derivatives of tetrahydropyran-2-methanol and tetrahydrofurfuryl alcohol even though there is an oxygen atom present. For the present purpose such radicals act as if they were entirely hydrocarbon in nature insofar that the presence of the oxygen atom contributes no objectionable property.

The oxypropylation, or for that matter the treatment of such monohydric compounds with any alkylene oxide and particularly ethylene oxide and propylene oxide, is well known. It is preferably conducted in the presence of an alkaline catalyst.

Briefly, then, a monohydric alcohol or other monohydric reactant having less than 8 carbon atoms in any single radical may be indicated thus: R'OH. Reacting such monohydric alcohol with propylene oxide the resultant ether alcohol may be indicated thus:

$$R'O(C_3H_6O)_nH$$

If for sake of simplicity the alcohol selected for oxypropylation is isopropyl alcohol the comparable derivative is indicated thus:

$$C_3H_7O(C_3H_6O)_nH$$

It has been pointed out previously that such monohydric ether alcohols must be of fairly high molecular weight and thus the value of $n$ in the two preceding formulas is within the range of approximately 12 to 80. My preference is that the molecular weight of the product at this stage be within the range of 2000 to 3000. Such ether alcohols can be obtained by other means which are well known. For instance, they are commercially available, polypropylene glycol having molecular weights within the range of 1,000 to 3,000, or even higher. Such products can, of course, be etherized with suitable reactants such as dimethyl sulfate, diethyl sulfate, methylbenzene sulfonate, ethylbenzene sulfonate, propylbenzene sulfonate, or the like, to yield the corresponding ether alcohol. Other procedures are known also such as oxypropylation of the chlorohydrin followed by treatment with an alkoxide, or conversion of the glycol into an alkoxide, followed by treatment with an organic chloride, such as benzylchloride or allylchloride. It is immaterial how such glycol ethers or ether alcohols are obtained.

Previous reference has been made to the use of certain monohydric compounds as initial raw materials. Examples are aliphatic alcohols such as methyl, ethyl, butyl alcohol, and the like, particularly glycol ethers obtained by treating methyl, ethyl or isopropyl and normal butyl alcohol with 1, 2 or 3, or more moles of propylene oxide. Needless to say, these products are equally satisfactory as starting materials and it simply means that the oxypropylation step is shortened.

For that matter similar materials are obtainable commercially such as certain low molal methoxy polyethyleneglycols as illustrated by ethylene glycol monomethyl ether, ethylene glycol monoethyl ether, ethylene glycol monobutyl ether, ethylene glycol ethylbutyl ether, ethylene glycol monophenyl ether, ethylene glycol monobenzyl ether, diethylene glycol monomethyl ether, diethylene glycol monoethyl ether, or diethylene glycol monobutyl ether.

Similarly, products could be obtained from butylene oxide except for the expense of this reagent or from a mixture of ethylene and propylene oxide. Obviously there is a limit to the amount of ethylene oxide that can be present for the reason that the monohydric compound on oxypropylation should become water-insoluble at an actual molecular weight range of 1,000 to 2,000, and in many instances at less than 1,000. Likewise, it is preferable that the compound become kerosene-soluble at an actual molecular weight range of 500 to 700 on up. The presence of more than a few ethylene oxide radicals, of course, prevents water-insolubility and prevents kerosene-solubility. The number present can vary, of course, with the terminal group and a degree of oxypropylation but in most cases would be comparatively small, i. e., less than 10 per molecule. In most cases, however, one might as well start with the initial monohydric material and subject it to oxypropylation.

For a number of well known reasons equipment, whether laboratory size, semi-pilot plant size, pilot plant size, or large scale size, is not as a rule designed for a particular alkylene oxide. Invariably and inevitably, however, or particularly in the case of laboratory equipment and pilot plant size the design is such as to use any of the customarily available alkylene oxide, i. e., ethylene oxide, propylene oxide, butylene oxide, glycide, epichlorohydrin, styrene oxide, etc. In the subsequent description of the equipment it becomes obvious that it is adapted for oxyethylation as well as oxypropylation.

Oxypropylations are conducted under a wide variety of conditions, not only in regard to presence or absence of catalyst, and the kind of catalyst, but also in regard to the time of reaction, temperature of reaction, speed of reaction, pressure during reaction, etc. For instance, oxyalkylations can be conducted at temperatures up to approximately 200° C. with pressures in about the same range up to about 200 pounds per square inch. They can be conducted also at temperatures approximating the boiling point of water or slightly above, as for example 95° to 120° C. Under such circumstances the pressure will be less than 30 pounds per square inch unless some special procedure is employed as is sometimes the case, to wit, keeping an atmosphere of inert gas such as nitrogen in the vessel during the reaction. Such low-temperature–low reaction rate oxypropylations have been described very completely in U. S. Patent No. 2,448,664, to H. R. Fife et al., dated September 7, 1948. Low temperature, low pressure oxypropylations are particularly desirable where the compound being subjected to oxypropylation contains one, two or three points of reaction only, such as monohydric alcohols, glycols and triols.

Since low pressure–low temperature reaction speed oxypropylations require considerable time, for instance, 1 to 7 days of 24 hours to each to complete the reaction, they are conducted as a rule whether on a laboratory scale, pilot plant scale, or large scale, so as to operate automatically. The prior figure of seven days applies especially to large-scale operations. I have used conventional equipment with two added automatic features; (a) a solenoid controlled valve which shuts off the propylene oxide in event that the temperature gets outside a predetermined and set range, for instance, 95° to 120° C., and (b) another solenoid valve which shuts off the propylene oxide (or for that matter ethylene oxide if it is being used) if the pressure gets beyond a predetermined range, such as 25 to 35 pounds. Otherwise, the equipment is substantially the same as is commonly employed for this purpose where the pressure of reaction is higher, speed of reaction is higher, and time of reaction is much shorter. In such instances such automatic controls are not necessarily used.

Thus, in preparing the various examples I have found it particularly advantageous to use laboratory equipment or pilot plant which is designed to permit continuous oxyalkylation whether it be oxypropylation or oxyethylation. With certain obvious changes the equipment can be used also to permit oxyalkylation involving the use of glycide where no pressure is involved except the vapor pressure of a solvent, if any, which may have been used as a diluent.

As previously pointed out the method of using propylene oxide is the same as ethylene oxide. This point is emphasized only for the reason that the apparatus is so designed and constructed as to use either oxide.

The oxypropylation procedure employed in the preparation of the oxyalkylated derivatives has been uniformly the same, particularly in light of the fact that a continuous automatically-controlled procedure was employed. In this procedure the autoclave was a conventional autoclave made of stainless steel and having a capacity of approximately 15 gallons and a working pressure of one thousand pounds gauge pressure. This pressure obviously is far beyond any requirement as far as propylene oxide goes unless there is a reaction of explosive violence involved due to accident. The autoclave was equipped with the conventional devices and openings, such as the variable-speed stirrer operating at speeds from 50 R. P. M. to 500 R. P. M.; thermometer well and thermocouple for mechanical thermometer; emptying outlet; pressure gauge, manual vent line; charge hole for initial reactants; at least one connection for introducing the alkylene oxide, such as propylene oxide or ethylene oxide, to the bottom of the autoclave; along with suitable devices for both cooling and heating the autoclave, such as a cooling jacket, and, preferably, coils in addition thereto, with the jacket so arranged that it is suitable for heating with steam or cooling with water and further equipped with electrical heating devices. Such autoclaves are, of course, in essence small-scale replicas of the usual conventional autoclave used in oxyalkylation procedures. In some instances in exploratory preparations an autoclave having a smaller capacity, for instance, approximately 3½ liters in one case and about 1¾ gallons in another case, was used.

Continuous operation, or substantially continuous operation, was achieved by the use of a separate container to hold the alkylene oxide being employed, particularly propylene oxide. In conjunction with the smaller autoclaves, the container consists essentially of a laboratory bomb having a capacity of about one-half gallon, or somewhat in excess thereof. In some instances a larger bomb was used, to wit, one having a capacity of about one gallon. This bomb was equipped, also, with an inlet of charging, and an eductor tube going to the bottom of the container so as to permit discharging of alkylene oxide in the liquid phase to the autoclave. A bomb having a capacity of about 60 pounds was used in connection with the 15-gallon autoclave. Other conventional equipment consists, of course, of the rupture disc, pressure gauge, sight feed glass, thermometer connection for nitrogen for pressuring bomb, etc. The bomb was placed on a scale during use. The connections between the bomb and the autoclave were flexible stainless steel hose or tubing so that continuous weighings could be made without breaking or making any connections. This applies also to the nitrogen line, which was used to pressure the bomb reservoir. To the extent that it was required, any other usual conventional procedure or addition which provided greater safety was used, of course, such as safety glass protective screens, etc.

Attention is directed again to what has been said previously in regard to automatic controls which shut off the propylene oxide in event temperature of reaction passes out of the predetermined range or if pressure in the autoclave passes out of predetermined range.

With this particular arrangement practically all oxypropylations become uniform in that the reaction temperature was held within a few degrees of any selected point, for instance, if 105° C. was selected as the operating temperature the maximum point would be at the most 110° C. or 112° C., and the lower point would be 95° or possibly 98° C. Similarly, the pressure was held at approximately 30 pounds within a 5-pound variation one way or the other, but might drop to practically zero, especially where no solvent such as xylene is employed. The speed of reaction was comparatively slow under such conditions as compared with oxyalkylations at 200° C. Numerous reactions were conducted in which the time varied from one day (24 hours) up to three days (72 hours), for completion of the final member of a series. In some instances the reaction may take place in considerably less time, i. e., 24 hours or less, as far as a partial oxypropylation is concerned. The minimum time recorded was about a 3-hour period in a single step. Reactions indicated as being complete in 10 hours may have been complete in a lesser period of time in light of the automatic equipment employed. This applies also where the reactions were complete in a shorter period of time, for instance, 4 to 5 hours. In the addition of propylene oxide, in the autoclave equipment as far as possible the valves were set so all the propylene oxide if fed continuously would be added at a rate so that the predetermined amount would react within the first 15 hours of the 24-hour period or two-thirds of any shorter period. This meant that if the reaction was interrupted automatically for a period of time for pressure to drop or temperature to drop the predetermined amount of oxide would still be added in most instances well within the predetermined time period. Sometimes where the addition was a comparatively small amount in a 10-hour period there would be an unquestionable speeding up of the reaction, by simply repeating the examples and using 3, 4 or 5 hours instead of 10 hours.

When operating at a comparatively high temperature, for instance, between 150° to 200° C., an unreacted alkylene oxide such as propylene oxide, makes its presence felt in the increase in pressure or the consistency of a higher pressure.

However, at a low enough temperature it may happen that the propylene oxide goes in as a liquid. If so, and if it remains unreacted there is, of course, an inherent danger and appropriate steps must be taken to safeguard against this possibility; if need be a sample must be withdrawn and examined for unreacted propylene oxide. One obvious procedure, of course, is to oxypropylate at a modestly higher temperature, for instance, at 140° to 150° C. Unreacted oxide affects determination of the acetyl or hydroxyl value of the hydroxylated compound obtained.

The higher the molecular weight of the compound, i. e., towards the latter stages of reaction, the longer the time required to add a given amount of oxide. One possible explanation is that the molecule, being larger, the opportunity for random reaction is decreased. Inversely, the lower the molecular weight the faster the reaction takes place. For this reason, sometimes at least, increasing the concentration of the catalyst does not appreciably speed up the reaction, particularly when the product subjected to oxyalkylation has a comparatively high molecular weight. However, as has been pointed out previously, operating at a low pressure and a low temperature even in large scale operations as much as a week or ten days' time may lapse to obtain some of the higher molecular weight derivatives from monohydric or dihydric materials.

In a number of operations the counterbalance scale or dial scale holding the propylene oxide bomb was so set that when the predetermined amount of propylene oxide had passed into the reaction the scale movement through a time operating device was set for either one to two hours so that reaction continued for 1 to 3 hours after the final addition of the last propylene oxide and thereafter the operation was shut down. This particular device is particularly suitable for use on larger equipment than laboratory size autoclaves, to wit, on semi-pilot plant or pilot plant size, as well as on large scale size. This final stirring period is intended to avoid the presence of unreacted oxide.

In this sort of operation, of course, the temperature range was controlled automatically by either use of cooling water, steam, or electrical heat, so as to raise or lower the temperature. The pressuring of the propylene oxide into the reaction vessel was also automatic insofar that the feed stream was set for a slow continuous run which was shut off in case the pressure passed a predetermined point as previously set out. All the points of design, construction, etc., were conventional including the gases, check valves and entire equipment. As far as I am aware at least two firms, and possibly three, specialize in autoclave equipment such as I have employed in the laboratory, and are prepared to furnish equipment of this same kind. Similarly pilot plant equipment is available. This point is simply made as a precaution in the direction of safety. Oxyalkylations, particularly involving ethylene oxide, glycide, propylene oxide, etc., should not be conducted except in equipment specifically designed for the purpose.

EXAMPLE 1a

The monohydric compound employed was isopropyl alcohol which was substantially anhydrous. In the initial oxypropylation this material was reacted with propylene oxide in the ratio of 20 moles of propylene oxide for one mole of the alcohol. The autoclave employed had a capacity of 15 gallons or about 120 pounds of reaction mass. The speed of the stirrer could be varied from 150 to 350 R. P. M. 3 pounds of isopropyl alcohol was charged into the autoclave along with one pound of sodium hydroxide. The reaction pot was flushed out with nitrogen. The autoclave was sealed and the automatic devices adjusted and set for injecting 58 pounds of propylene oxide in 7 hours with an allowance of another hour for stirring to insure completeness of reaction. The pressure regulator was set for a maximum of 35 pounds per square inch. This meant that the bulk of the reaction could take place, and probably did take place, at a comparatively lower pressure. This comparatively low pressure was the result of the fact that considerable catalyst was present. The propylene oxide was added at the rate of about 8 pounds per hour. More important, the selected temperature range was 205° to 215° F. (about the boiling point of water). The initial introduction of propylene oxide was not started until the heating devices had raised the temperature to about the boiling point of water. At the completion of the reaction the molecular weight, based on a hydroxyl value determination, was 723 compared with a theoretical molecular weight of 1220.

The final product was water-soluble or dispersible in xylene but not soluble in kerosene, or at least the bulk of the compound was not soluble in kerosene.

This batch of 61 pounds, except for a small amount withdrawn as a sample, was divided into 5 equal portions and subsequently subjected to further oxypropylation as described in Examples 2a to 6a inclusive.

EXAMPLE 2a

In this instance a 5-gallon autoclave was used instead of a 15-gallon autoclave. The equipment and design of the 5-gallon autoclave was the same as that of the 15-gallon autoclave.

The same procedure was employed as in Example 1a, preceding, except that the initial reactant was 12.2 pounds of the oxypropylated derivative described as Example 1a, preceding. To this mixture there was added 4 ounces of caustic soda. The time period was approximately 1½ hours with an added 45 minutes for stirring. The amount of oxide added was 11.6 pounds.

The molecular weight, based on hydroxyl value, was 1060, compared with a theoretical molecular weight of 2380.

The conditions of temperature and pressure were substantially the same as in Example 1a, preceding. The product was water-insoluble, xylene-soluble and kerosene-soluble. This statement applies also to the next four examples and will not be repeated.

Incidentally, the appearance of all these products varied from rather viscous, colorless or straw-colored compounds, to others having an amber tint. Those of the highest molecular weight would hardly flow at ordinary temperature or at least were rather viscous. For convenience, I have stored samples in wide-mouth cans. This applies to all the various samples herein described and this statement will not be repeated.

EXAMPLE 3a

The same procedure was followed as in Example 2a, preceding, i. e., the initial charge was 12.2 pounds of the product identified as Example 1a, preceding. The amount of propylene oxide added was 23.2 pounds. The amount of alkaline catalyst added was 6 ounces. The oxypropylation in this particular instance and in the remaining three examples, was conducted in the 20-gallon autoclave. The time period was 4 hours for the addition of the propylene oxide and the product was stirred for one hour after completion of the reaction. The final product showed a molecular weight, based on hydroxyl value, of 1570 compared with a theoretical molecular weight of 3540. The conditions of temperature and pressure were all the same as in the previous examples and, as a matter of fact, apply to all the subsequent examples in this series, i. e., Examples 4a through 6a, so this information will not be repeated.

EXAMPLE 4a

The initial reactant was the same as in the two preceding Examples 2a and 3a, i. e., 12.2 pounds of the product identified as Example 1a, preceding. The amount of propylene oxide added was 34 pounds. The amount of alkaline catalyst employed was 9 ounces. The time required to add the propylene oxide was 4½ hours with an allowance of 1½ hours for stirring to insure completion of reaction.

The molecular weight, based on hydroxyl number determination was 1813 compared with a theoretical molecular weight of 4700.

EXAMPLE 5a

The same procedure was followed as in Examples 2a, 3a and 4a, preceding. The initial reactant was 12.2 pounds of the material previously identified as Example 1a. The amount of propylene oxide added was 46.4 pounds. The amount of catalyst added was 12 ounces of caustic soda. The time period for introduction of the oxide was 6½ hours and the reaction mass was stirred for another hour to insure completion of reaction.

The final product showed a molecular weight based on hydroxy number of 2200 compared with a theoretical molecular weight of 5860.

EXAMPLE 6a

The same procedure was followed as in Example 5a, preceding. The initial reactant was 12.2 pounds of the product identified as Example 1a, preceding. The amount of propylene oxide added was 58 pounds. The amount of catalyst was one pound of caustic soda. The propylene oxide was added in a 7½ hour period with 2 hours added for stirring to insure completeness of reaction. The molecular weight of the product, based on a hydroxyl value determination, was 2460, and based on a theoretical molecular weight it was 7020.

The same procedure was employed in connection with other monohydric compounds, such as N-butanol and N-hexanol. The characteristics of the products were the same except that there may have been a slight difference in that in the first state the product showed a trifle less water-solubility and a little greater xylene-solubility than in Example 1a.

Particular reference is made to comparable Example 7a derived from butanol and Example 13a derived from hexanol, as noted in following Table 1. Table 1 includes data in regard to Examples 1a through 6a, and also Examples 7a through 12a derived from N-butanol and Examples 13a through 18a derived from N-hexanol.

In the following table all examples were conducted in exactly the same molal ratio as in the first series, the only difference being as follows: In the case of butanol the initial reaction involved 3.7 pounds of butanol instead of 3 pounds as in the case of isopropanol. The initial reaction mass was broken into five parts of approximately 12.4 pounds each instead of 12.2 pounds as in the series above described. The amount of oxide added, the amount of catalyst added, the time factor, temperature factor, pressure factor, etc., were all substantially identical within ability to repeat two series as in the case of Examples 1a through 6a.

The same slight modification applies to Examples 13a through 18a. In other words 5.1 pounds of hexanol were employed instead of 3 pounds of isopropanol. Similarly, this initial oxypropylation was broken into five parts of approximately 12.6 pounds each which was employed instead of the 12.2 pounds in the first series, and 12.4 pounds in the second series. Here again all the conditions of oxypropylation were substantially the same as in series 1a through 6a.

Table 1

| Example No. | Initial Monohydric Compound | Theoretical Weight | Molecular Weight Based on Hydroxyl Value |
|---|---|---|---|
| 1a | Isopropanol | 1,220 | 723 |
| 2a | do | 2,380 | 1,060 |
| 3a | do | 3,540 | 1,570 |
| 4a | do | 4,700 | 1,813 |
| 5a | do | 5,860 | 2,200 |
| 6a | do | 7,020 | 2,460 |
| 7a | N-butanol | 1,234 | 695 |
| 8a | do | 2,394 | 1,010 |
| 9a | do | 3,554 | 1,423 |
| 10a | do | 4,714 | 1,740 |
| 11a | do | 5,874 | 2,050 |
| 12a | do | 7,034 | 2,210 |
| 13a | N-hexanol | 1,262 | 736 |
| 14a | do | 2,422 | 1,050 |
| 15a | do | 3,582 | 1,510 |
| 16a | do | 4,742 | 1,620 |
| 17a | do | 5,902 | 1,755 |
| 18a | do | 7,062 | 1,985 |

Although caustic soda was used in the above oxypropylation needless to say any other suitable catalyst, such as sodium methylate, caustic potash, or the like, could have been employed equally satisfactorily.

Speaking of insolubility in water or solubility in kerosene such solubility test can be made simply by shaking small amounts of the materials in a test tube with water, for instance, using 1% to 5% approximately based on the amount of water present.

Needless to say, there is no complete conversion of propylene oxide into the desired hydroxylated compounds. This is indicated by the fact that the theoretical molecular weight based on a statistical average is greater than the molecular weight calculated by usual methods on basis of acetyl or hydroxyl value. Actually, there is no completely satisfactory method for determining molecular weights of these types of compounds with a high degree of accuracy when the molecular weights exceed 1,000 or 2,000. In some instances the acetyl value or hydroxyl value serves as satisfactorily as an index to the molecular weight as any other procedure, subject to the above limitations, and especially in the higher molecular weight range. If any difficulty is encountered in the manufacture of the esters the stoichiometrical amount of acid or acid compound should be taken which corresponds to the indicated acetyl or hydroxyl value. This matter has been discussed in the literature and is a matter of common knowledge and requires no further elaboration. In fact, it is illustrated by some of the examples appearing in the patent previously mentioned.

In order to afford an opportunity for comparison with the same compounds prepared from polypropylene glycol instead of polypropylene glycol ethers it has been considered advantageous to select such ethers which correspond in molecular weight to some of the readily available polypropylene glycols. This is particularly true in regard to the methyl ethers and the propyl ethers. The procedure is illustrated by the following example.

EXAMPLE 1b

In a reaction flask there were placed 8 grams of maleic anhydride, 311 grams of the propyl ether of a polypropylene glycol corresponding to polypropylene glycol 2025. The molal ratio was two moles of the glycol ether to one mole of the anhydride. Approximately 1% of toluene sulfonic acid was added, based on the weight of the glycol ether. In this instance three grams of the sulfonic acid were used. There was added also 50 cc. of xylene. Heat was applied and refluxing permitted to continue for about 3½ hours. The maximum temperature during the reflux period was approximately 145° C. The amount of water which distilled over was about 1 cc. At the end of the reaction period there was still a slight acidity due to the uncombined maleic acid radicals and the presence of the acid catalyst. A small amount of 30% aqueous caustic soda was added until sufficient had been introduced to neutralize the acidity present. After this adjustment, 8 grams of powdered sodium bisulfite were added. Apparently enough water had been added to dissolve at least part of the sodium bisulfite so that further addition of water was not required. Needless to say, if no caustic soda solution was added to neutralize the acidity, then a little water should be added to dissolve at least part or all of the sodium bisulfite so as to give a saturated solution. The reaction mixture was stirred and heated for three hours. No further effort was made to have any reflux take place during this stage of the reaction for the obvious reason that if water were removed and if sodium bisulfite were anhydrous there would be little or no opportunity for a reaction period. This is also necessary for the reason that sodium bi-sulfite begins to decompose at about 100° C. and this reaction must be conducted at a suitable temperature until the sodium bisulfite has combined. Thereafter, the xylene can be distilled over in the usual manner, removing any water with it and all the xylene can be removed by distillation, particularly vacuum distillation.

The same procedure was followed in connection with a number of additional examples, all of which are illustrated in the following table which gives the reactants, amounts employed, temperature of esterification, etc.

*Table 2*

| Ex. No. | Kind and Mol. Wt. of p. p. g. Ether Used | Amt. Used (grs.) | Dicarboxy Reactant | Amt. Used (grs.) | Xylene (c. c. m.) | Max. Esterification Temp. (°C.) | Esterification time (hrs.) | Sod. Bisulfite (grs.) | Max. Reaction Temp., °C. | Reaction Time (Hrs.) |
|---|---|---|---|---|---|---|---|---|---|---|
| 1b | Propyl. 2070 | 311 | Maleic Anhyd. | 8 | 50 | 145 | 3½ | 8 | 80-95 | 3 |
| 2b | Propyl. 770 | 121 | do | 8 | 45 | 139 | 4 | 8 | 80-95 | 4½ |
| 3b | Propyl. 1070 | 161 | do | 8 | 45 | 142 | 3½ | 8 | 80-95 | 4¾ |
| 4b | Propyl. 2570 | 381 | do | 8 | 60 | 145 | 4¾ | 8 | 80-95 | 3¾ |
| 5b | Propyl. 1570 | 236 | do | 8 | 50 | 143 | 4½ | 8 | 80-95 | 3½ |
| 6b | Propyl. 2070 | 311 | Citrac. Anhyd. | 9 | 50 | 144 | 3¾ | 8 | 80-95 | 3½ |
| 7b | Propyl. 770 | 121 | do | 9 | 45 | 139 | 4 | 8 | 80-95 | 4½ |
| 8b | Propyl. 1070 | 161 | do | 9 | 45 | 142 | 3½ | 8 | 80-95 | 4½ |
| 9b | Propyl. 2570 | 381 | do | 9 | 60 | 145 | 4 | 8 | 80-95 | 4 |
| 10b | Propyl. 1570 | 236 | do | 9 | 50 | 140 | 4¼ | 8 | 80-95 | 3¾ |
| 11b | Methyl. 2040 | 307 | Maleic Anhyd. | 8 | 50 | 144 | 3¾ | 8 | 80-95 | 3½ |
| 12b | Methyl. 740 | 117 | do | 8 | 45 | 139 | 4¼ | 8 | 80-95 | 4½ |
| 13b | Methyl. 1040 | 157 | do | 8 | 45 | 143 | 3½ | 8 | 80-95 | 4¼ |
| 14b | Methyl. 2540 | 377 | do | 8 | 60 | 145 | 4 | 8 | 80-95 | 4¼ |
| 15b | Methyl. 1540 | 232 | do | 8 | 50 | 143 | 4¼ | 8 | 80-95 | 3¾ |
| 16b | Methyl. 2040 | 307 | Citrac. Anhyd. | 9 | 50 | 144 | 3¾ | 8 | 80-95 | 3 |
| 17b | Methyl. 740 | 117 | do | 9 | 45 | 139 | 4 | 8 | 80-95 | 4½ |
| 18b | Methyl. 1040 | 157 | do | 9 | 45 | 140 | 3½ | 8 | 80-95 | 4½ |
| 19b | Methyl. 2540 | 377 | do | 9 | 60 | 145 | 4 | 8 | 80-95 | 4 |
| 20b | Methyl. 1540 | 232 | do | 9 | 50 | 142 | 4¾ | 8 | 80-95 | 4 |

In the above table the kind of ether is indicated by the characterizing radical, i. e., propyl or methyl. The actual ether alcohol was, of course, the corresponding polypropylene glycol ether, i. e., either the propyl ether or the methyl ether and the figure indicates the molecular weight which in a general way corresponds to molecular weight of available polypropylene glycols, i. e., polypropylene glycol 2025, polypropylene glycol 725, polypropylene glycol 1025, polypropylene glycol 2525, and polypropylene glycol 1525. As previously pointed out these ethers, and for that matter the corresponding glycols, represent cogeneric mixtures whose statistical average molecular weights are the particular weights indicated. Reference in the table is, of course, to the hydroxyl value molecular weight for the obvious reason that this is the basis for calculating the amount of reactants required.

In all instances a small amount of 30% caustic soda solution was used as in the more complete description of Example 1b, and also an amount of toluene sulfonic acid approximating 1% of the weight of the glycol ether, or slightly less, was used in the esterification step. A larger amount should not be used because there may be decomposition of the glycol ether. Smaller amounts can be used, for example, ½% or ¾% based on the amount of glycol ether provided, however, that the esterification time is extended.

The products obtained are comparable to the initial glycol ether in appearance, etc., i. e., usually they are an amber color or at least of a slight straw color, and often somewhat thicker than the original glycol ether. This description applies of course, to materials after the removal of the solvent, i. e., the xylene. For use as demulsifiers there is no need to remove the xylene and it may remain behind. Obviously other liquids than xylene may be used in esterification procedure.

However, if the boiling point is any higher than xylene there is danger that decomposition may take place unless the amount of sulfonic acid is reduced. Other catalysts such as a small amount of dry hydrochloric acid can be used but it appears less desirable than the sulfonic acid. Needless to say, the caustic soda solution used neutralizes the sulfonic acid catalyst present.

The equipment used in esterification procedure is a resin pot of the kind described in U. S. Patent No. 2,499,370, dated March 7, 1950, to De Groote and Keiser. Any conventional equipment can be used, either on a small scale, pilot plant scale, or larger scale.

In the various examples preceding only one glycol ether has been used in these cases. Actually there is no reason why one may not use two different glycol ethers, for instance, an equimolar mixture of two glycol ethers, one for example having a molecular weight of 2000 and the other 3000; or one having a molecular weight of 1500 and the other 2500. Actually these glycol ethers are cogeneric mixtures at each selected molecular weight. If one does make a mixture of the kind here described actually three types of compounds will appear, one type in which both carboxyl radicals of the polycarboxy acid are joined with the higher glycol ether, one type where both carboxyls are joined with the lower molecular weight glycol ether, and one type where one carboxyl is united to a higher molecular weight glycol ether, and the other one to a lower molecular weight glycol ether.

Other variations are obviously possible by using different radicals in the ether positions, such as methyl glycol ethers or propyl glycol ethers. For example, the same dicarboxy reactant can be used, such as maleic anhydride united with different ethers of the same glycol, for instance, the two previously mentioned, or the different ether groups might be joined to glycol of different molecular weights.

The products so obtained are peculiar (a) insofar that there is not present any radical having 8 or more uninterrupted carbon atoms, and (b) the compounds are not particularly effective as surface-active agents in the ordinary sense due either to the large molecular size or the absence of a hydrophobe radical of the kind previously referred to, or for some other reason which is obscure. The chemical compounds herein employed as demulsifiers have molecular weights varying from more than 1000 up to several thousands, for instance, 5000, 6000, or 7000, and yet contain only one sulfo radical. Utility of such compounds for industrial uses is rather unusual. They are not effective emulsifying agents, but are valuable as an additive or a promoter of emulsions. These compounds also have hydrotropic property and serve as common solvents in the preparation of micellar solutions. It is to be noted that they are free from terminal carboxyl radicals and thus differ from reagents obtained, for example, by treating one mole of a high molal polypropylene glycol with 2 moles of a dicarboxy acid. It is probable these reagents, due to their peculiar structure and their peculiar solubility characteristics, will find utility in other fields of application now unknown.

Conventional demulsifying agents employed in the treatment of oil field emulsions are used as such, or after dilution with any suitable solvent, such as water, petroleum hydrocarbons, such as benzene, toluene, xylene, tar acid oil, cresol, anthracene oil, etc. Alcohols, particularly aliphatic alcohols, such as methyl alcohol, ethyl alcohol, denatured alcohol, propyl alcohol, butyl alcohol, hexyl alcohol, octyl alcohol, etc., may be employed as diluents. Miscellaneous solvents such as pine oil, carbon tetrachloride, sulfur dioxide extract obtained in the refining of petroleum, etc., may be employed as diluents. Similarly, the material or materials employed as the demulsifying agent of my process may be admixed with one or more of the solvents customarily used in connection with conventional demulsifying agents. Moreover, said material or materials may be used alone or in admixture with other suitable well-known classes of demulsifying agents.

It is well known that conventional demulsifying agents may be used in a water-soluble form, or in an oil-soluble form, or in a form exhibiting both oil- and water-solubility. Sometimes they may be used in a form which exhibits relatively limited oil-solubility. However, since such reagents are frequently used in a ratio of 1 to 10,000 or 1 to 20,000, or 1 to 30,000, or even 1 to 40,000, or 1 to 50,000 as in desalting practice, such an apparent insolubility in oil and water is not significant because said reagents undoubtedly have solubility within such concentrations. This same fact is true in regard to the material or materials employed as the demulsifying agent of my process.

In practicing my process for resolving petroleum emulsions of the water-in-oil type, a treating agent or demulsifying agent of the kind above described is brought into contact with or caused to act upon the emulsion to be treated, in any of the various apparatus now generally used to resolve or break petroleum emulsions with a chemical reagent, the above procedure being used alone or in combination with other demulsifying procedure, such as the electrical dehydration process.

One type of procedure is to accumulate a volume of emulsified oil in a tank and conduct a batch treatment type of demulsification procedure to recover clean oil. In this procedure the emulsion is admixed with the demulsifier, for example by agitating the tank of emulsion and slowly dripping demulsifier into the emulsion. In some cases mixing is achieved by heating the emulsion while dripping in the demulsifier, depending upon the convection currents in the emulsion to produce satisfactory admixture. In a third modification of this type of treatment, a circulating pump withdraws emulsion from, e. g., the bottom of the tank, and reintroduces it into the top of the tank, the demulsifier being added, for example, at the suction side of said circulating pump.

In a second type of treating procedure, the demulsifier is introduced into the well fluids at the well-head or at some point between the well-head and the final oil storage tank, by means of an adjustable proportioning mechanism or proportioning pump. Ordinarily the flow of fluids through the subsequent lines and fittings suffices to produce the desired degree of mixing of demulsifier and emulsion, although in some instances additional mixing devices may be introduced into the flow system. In this general procedure, the system may include various mechanical devices for withdrawing free water, separating entrained water, or accomplishing quiescent settling of the chemicalized emulsion. Heating devices may likewise be incorporated in any of the treating procedures described herein.

A third type of application (down-the-hole) of demulsifier to emulsion is to introduce the demulsifier either periodically or continuously in diluted or undiluted form into the well and to allow it to come to the surface with the well fluids, and then to flow the chemicalized emulsion through any desirable surface equipment, such as employed in the other treating procedures. This particular type of application is decidedly useful when the demulsifier is used in connection with acidification of calcareous oil-bearing strata, especially if suspended in or dissolved in the acid employed for acidification.

In all cases, it will be apparent from the foregoing description, the broad process consists simply in introducing a relatively small proportion of demulsifier into a relatively large proportion of emulsion, admixing the chemical and emulsion either through natural flow or through special apparatus, with or without the application of heat, and allowing the mixture to stand quiescent until the undesirable water content of the emulsion separates and settles from the mass.

The following is a typical installation.

A reservoir to hold the demulsifier of the kind described (diluted or undiluted) is placed at the well-head where the effluent liquids leave the well. This reservoir or container, which may vary from 5 gallons to 50 gallons for convenience, is connected to a proportioning pump which injects the demulsifier drop-wise into the fluids leaving the well. Such chemicalized fluids pass through the flowline into a settling tank. The settling tank consists of a tank of any convenient size, for instance, one which will hold amounts of fluid produced in 4 to 24 hours (500 barrels' to 2000 barrels' capacity), and in which there is a perpendicular conduit from the top of the tank to almost the very bottom so as to permit the incoming fluids to pass from the top of the settling tank to the bottom, so that such incoming fluids do not disturb stratification which takes place during the course of demulsification. The settling tank has two outlets, one being below the water level to drain off the water resulting from demulsification or accompanying the emulsion as free water, the other being an oil outlet at the top to permit the passage of dehydrated oil to a second tank, being a storage tank, which holds pipeline or dehydrated oil. If desired, the conduit or pipe which serves to carry the fluids from the well to the settling tank may include a section of pipe with baffles to serve as a mixer, to insure thorough distribution of the demulsifier throughout the fluids, or a heater for raising the temperature of the fluids to some convenient temperature, for instance, 120° to 160° F., or both heater and mixer.

Demulsification procedure is started by simply setting the pump so as to feed a comparatively large ratio of demulsifier, for instance, 1:5,000. As soon as a complete "break" or satisfactory demulsification is obtained, the pump is regulated until experience shows that the amount of demulsifier being added is just sufficient to produce clean or dehydrated oil. The amount being fed at such stage is usually 1:10,000, 1:15,000, 1:20,000, or the like.

In many instances the products herein specified as demulsifiers can be conveniently used without dilution. However, as previously noted, they may be diluted as desired with any suitable solvent. For instance, by mixing 75 parts by weight of such derivative, for example, the product of Example 4b with 15 parts by weight of xylene and 10 parts by weight of isopropyl alcohol, an excellent demulsifier is obtained. Selection of the solvent will vary, depending upon the solubility characteristics of the product, and of course will be dictated in part by economic considerations, i. e., cost.

As noted above, the products herein described may be used not only in diluted form, but also may be used admixed with some other chemical demulsifier.

Having thus described my invention, what I claim as new and desire to secure by Letters Patent, is:

1. A process for breaking petroleum emulsions of the water-in-oil type characterized by subjecting the emulsion to the action of a demulsifier including hydrophile synthetic products; said hydrophile synthetic products being characterized by the following formula:

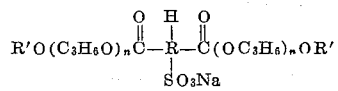

in which

is the divalent radical of an unsaturated dicarboxy acid selected from the class consisting of maleic acid, fumaric acid, and citraconic acid, and $n$ is a whole number varying from 12 to 80; R' is a hydrocarbon radical having less than 8 carbon atoms; and with the further proviso that the corresponding polypropylene glycol ether of the formula $R'O(C_3H_6O)_nH$ be water-insoluble and kerosene-soluble.

2. The process of claim 1 wherein the dicarboxy acid is maleic acid.

3. The process of claim 1 wherein the dicarboxy acid is maleic acid and the value of $n$ corresponds to a polypropylene glycol of approximately 700 molecular weight.

4. The process of claim 1 wherein the dicarboxy acid is maleic acid and the value of $n$ corresponds to a polypropylene glycol of approximately 1000 molecular weight.

5. The process of claim 1 wherein the dicarboxy acid is maleic acid and the value of $n$ corresponds to a polypropylene glycol of approximately 1500 molecular weight.

6. The process of claim 1 wherein the dicarboxy acid is maleic acid and the value of $n$ corresponds to a polypropylene glycol of approximately 2000 molecular weight.

7. The process of claim 1 wherein the dicarboxy acid is maleic acid and the value of $n$ corresponds to a polypropylene glycol of approximately 2500 molecular weight.

MELVIN DE GROOTE.

REFERENCES CITED

The following references are of record in the file of this patent:

UNITED STATES PATENTS

| Number | Name | Date |
| --- | --- | --- |
| 2,072,085 | De Groote et al. | Mar. 2, 1937 |
| 2,184,794 | De Groote | Dec. 26, 1939 |
| 2,301,609 | Bonnet | Nov. 10, 1942 |
| 2,305,067 | De Groote | Dec. 15, 1942 |
| 2,315,375 | Nawiasky et al. | Mar. 30, 1943 |
| 2,353,694 | De Groote | July 18, 1944 |
| 2,514,399 | Kirkpatrick et al. | July 11, 1950 |